United States Patent
Li et al.

(10) Patent No.: US 12,507,094 B2
(45) Date of Patent: Dec. 23, 2025

(54) DATA PACKET DELAY JITTER MONITORING METHOD AND DEVICE

(71) Applicants: China Mobile Communication Co., Ltd Research Institute, Beijing (CN); China Mobile Communications Group Co., Ltd., Beijing (CN)

(72) Inventors: Yongjing Li, Beijing (CN); Dan Wang, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 571 days.

(21) Appl. No.: 17/916,892

(22) PCT Filed: Apr. 7, 2021

(86) PCT No.: PCT/CN2021/085827
§ 371 (c)(1),
(2) Date: Oct. 4, 2022

(87) PCT Pub. No.: WO2021/204161
PCT Pub. Date: Oct. 14, 2021

(65) Prior Publication Data
US 2023/0164600 A1    May 25, 2023

(30) Foreign Application Priority Data
Apr. 8, 2020 (CN) .......................... 202010270781.1

(51) Int. Cl.
*H04W 24/08* (2009.01)
*H04L 43/087* (2022.01)
*H04M 15/00* (2006.01)

(52) U.S. Cl.
CPC .......... *H04W 24/08* (2013.01); *H04L 43/087* (2013.01); *H04M 15/66* (2013.01)

(58) Field of Classification Search
CPC ............. H04L 41/0893; H04L 41/0894; H04L 41/5009; H04L 43/08; H04L 43/087; H04M 15/66; H04W 24/08
See application file for complete search history.

(56) References Cited

U.S. PATENT DOCUMENTS

2019/0215731 A1* 7/2019 Qiao ..................... H04W 24/06
2020/0228429 A1 7/2020 Xin et al.
(Continued)

FOREIGN PATENT DOCUMENTS

| CN | 109600759 A | 4/2019 |
| CN | 110972193 A | 4/2020 |

(Continued)

OTHER PUBLICATIONS

Huawei, HiSilicon, TS 23.502: Terminology Correction on NWDAF, SA WG2 Meeting #122E e-meeting, S2-176782, Sep. 11-15, 2017, Elbonia.

(Continued)

*Primary Examiner* — Thomas R Cairns
(74) *Attorney, Agent, or Firm* — Price Heneveld LLP

(57) ABSTRACT

A method and a device of monitoring packet delay jitter are provided. The method includes: receiving packet delay data from SMF and/or UPF, and sending the packet delay data and one or more first parameters to DAF, and receiving the packet delay jitter from the DAF, the one or more first parameters being used to indicate time-related parameters needing to be referred to for obtaining the packet delay jitter.

20 Claims, 8 Drawing Sheets

(56) References Cited

U.S. PATENT DOCUMENTS

| | | | |
|---|---|---|---|
| 2021/0204198 A1 | 7/2021 | Xin et al. | |
| 2021/0218679 A1 | 7/2021 | Chong et al. | |
| 2021/0219185 A1 | 7/2021 | Xin et al. | |
| 2022/0303804 A1* | 9/2022 | Ha | H04W 24/08 |

FOREIGN PATENT DOCUMENTS

| | | |
|---|---|---|
| CN | 110972208 A | 4/2020 |
| WO | 2020049181 A1 | 3/2020 |
| WO | 2020063963 A1 | 4/2020 |

OTHER PUBLICATIONS

Huawei, HiSilicon, Intel, Convida Wireless LLC, Solution for QoS Provisioning and Adjustment, SA WG2 Meeting #127 S2-183635, Apr. 16-20, 2018, Sanya, China.

ZTE, "Gap analysis between solution of Key issue 3A and R16 TSN solution and give a proposal", S2-20000939, SA WG2 Meeting #52-136AH, Jan. 13-17, 2020, Incheon, South Korea.

China Mobile, "KI #3A, New Solution: Mechanism for AF requesting 5G network jitter", S2-2003777, SA WG2 Meeting #139E, Jun. 1-12, 2020, Electronic, Elbonia.

A Global Initiative, "Study on enhanced support of Industrial Internet of Things (IIoT) in the 5G System (5GS)". 23700-20-v050 MCCclean, 3rd Generation Partnership Project; Technical Specification Group Services and System Aspects, Release 17, Sep. 2020.

A Global Initiative, "Study on enhanced support of Industrial Internet of Things (IIoT) in the 5G System (5GS)", 23700-20-v050 rm, 3rd Generation Partnership Project; Technical Specification Group Services and System Aspects, Release 17, Sep. 2020.

* cited by examiner

DATA PACKET DELAY JITTER MONITORING METHOD AND DEVICE

CROSS-REFERENCE TO RELATED APPLICATION

This application is a U.S. national phase application of a PCT Application No. PCT/CN2021/085827 filed on Apr. 7, 2021, which claims a priority to Chinese Patent Application No. 202010270781.1 filed on Apr. 8, 2020, the disclosures of which are incorporated in their entirety by reference herein.

TECHNICAL FIELD

The present disclosure relates to the field of communications technology, and in particular, relates to a method and a device for monitoring data packet delay jitter.

BACKGROUND

To face challenges of wireless broadband technology and maintain a leading advantage of networks of the $3^{rd}$ generation partnership project (3GPP), a 3GPP standard group formulated a network architecture of a next generation system at the end of 2016, which is called the 5th generation (5G) network architecture.

In the 5G network architecture, a scenario of ultra-reliable low latency communication (URLLC) is defined, which mainly includes services requiring low latency and high reliable connection such as unmanned vehicles, industrial automation, etc. An advanced air-interface technology and an optimized core network architecture of the 5G network make requirements of the above scenarios possible. However, the 5G network itself has certain instability in a lower-layer link or an upper-layer routing protocol. Further, from a network construction aspect, a delay, an error and even a network failure are always unavoidable. Most of the above scenarios are services associated with life safety or production safety, and no mistake shall be allowed. Therefore, when we use the 5G network to serve the above-mentioned services associated with life safety or production safety, it is required that the 5G network can provide real-time monitoring of quality of service, and when the quality of service does not meet preset conditions, corresponding adjustment measures or protective measures can be taken so that links that meet the service requirements can be selected for the user.

Packet delay jitter is one of important indexes used to evaluate network performance. However, there is no solution to how the core network acquires the packet delay jitter.

SUMMARY

Embodiments of the present disclosure provide a method of monitoring packet delay jitter and a device of monitoring packet delay jitter, to solve the problem that a core network cannot obtain the packet delay jitter.

In a first aspect, a method of monitoring packet delay jitter is provided in some embodiments of the present disclosure. The method is performed by Policy Control Function PCF, the method includes: receiving packet delay data from Session Management Function SMF and/or User Plane Function UPF; sending the packet delay data and one or more first parameters to Data Analytics Function DAF, wherein the one or more first parameters are configured to represent one or more time-related parameters that need to be referred to for obtaining the delay jitter; receiving the packet delay jitter from the DAF.

Optionally, the method further includes: receiving a first request sent by an NEF or AF, wherein the first request is configured to request to perform a delay jitter obtaining operation, and the first request includes the one or more first parameters.

Optionally, the one or more first parameters include at least one of following: packet delay jitter measurement duration, packet delay jitter measurement frequency, and a quantity of packet delay jitter measurement times.

Optionally, the method further includes: sending the packet delay jitter to Network Exposure Function NEF or an Application Function AF.

In a second aspect, a method of monitoring packet delay jitter is further provided in some embodiments of the present disclosure. The method is performed by an Application Function AF, the method includes: sending a first request to Network Exposure Function NEF or Policy Control Function PCF, wherein the first request includes one or more first parameters, the first request is configured to request to perform a delay jitter obtaining operation, the one or more first parameters are configured to represent one or more time-related parameters that need to be referred to for obtaining the delay jitter; receiving the packet delay jitter from the NEF or the PCF, wherein the packet delay jitter is obtained by Data Analytics Function DAF according to packet delay data sent by the PCF and the one or more first parameters sent by the PCF.

Optionally, the first request is a Quality of Service QoS monitoring request, and a specified value of a specified field in the QoS monitoring request is configured to indicate that performing a delay jitter obtaining operation is requested.

Optionally, the first request is a service request other than a Quality of Service QoS monitoring request; a specified value of a specified field in the service request is configured to indicate that performing a delay jitter obtaining operation is requested, or the service request is configured to indicate that performing the delay jitter obtaining operation is requested.

Optionally, the one or more first parameters are at least one of: packet delay jitter measurement duration, packet delay jitter measurement frequency, and a quantity of packet delay jitter measurement times.

In a third aspect, a method of monitoring packet delay jitter is further provided in some embodiments of the present disclosure. The method is performed by Data Analytics Function DAF, the method includes: receiving packet delay data and one or more first parameters from Policy Control Function PCF, wherein the one or more first parameters are configured to represent one or more time-related parameters that need to be referred to for obtaining the delay jitter; obtaining the packet delay jitter according to the packet delay data and the one or more first parameters; sending the packet delay jitter to the PCF.

Optionally, the one or more first parameters are at least one of: packet delay jitter measurement duration, packet delay jitter measurement frequency, and a quantity of packet delay jitter measurement times.

In a fourth aspect, Policy Control Function PCF is provided in some embodiments of the present disclosure. The PCF includes: a first receiving module, configured to receive packet delay data from Session Management Function SMF and/or User Plane Function UPF; a first sending module, configured to send the packet delay data and one or more first parameters to Data Analytics Function DAF, wherein the one or more first parameters are configured to represent one or more time-related parameters that need to be referred to for obtaining the delay jitter; a second receiving module, configured to receive the packet delay jitter from the DAF.

In a fifth aspect, Policy Control Function PCF is further provided in some embodiments of the present disclosure. The PCF includes: a first transceiver and a first processor; wherein, the first transceiver is configured to receive and transmit data under control of the first processor; the first processor is configured to invoke a program in a memory and perform the following: receiving packet delay data from Session Management Function SMF and/or User Plane Function UPF; sending the packet delay data and one or more first parameters to Data Analytics Function DAF, wherein the one or more first parameters are configured to represent one or more time-related parameters that need to be referred to for obtaining a delay jitter; receiving packet delay jitter from the DAF.

In a sixth aspect, an Application Function AF is provided in some embodiments of the present application. The AF includes: a second sending module, configured to send a first request to Network Exposure Function NEF or Policy Control Function PCF, wherein the first request includes one or more first parameters, the first request is configured to request to perform a delay jitter obtaining operation, the one or more first parameters are configured to represent one or more time-related parameters that need to be referred to for obtaining a delay jitter; a third receiving module, configured to receive the packet delay jitter from the NEF or the PCF, wherein the packet delay jitter is obtained by Data Analytics Function DAF according to packet delay data sent by the PCF and the one or more first parameters sent by the PCF.

In a seventh aspect, an Application Function AF is provided in some embodiments of the present application. The AF includes: a second transceiver and a second processor; wherein the second transceiver is configured to receive and transmit data under control of the second processor; the second processor is configured to invoke a program in a memory and perform the following: sending a first request to Network Exposure Function NEF or Policy Control Function PCF, wherein the first request includes one or more first parameters, the first request is configured to request to perform a delay jitter obtaining operation, the one or more first parameters are configured to represent one or more time-related parameters that need to be referred to for obtaining the delay jitter; receiving the packet delay jitter from the NEF or the PCF, wherein the packet delay jitter is obtained by Data Analytics Function DAF according to packet delay data sent by the PCF and the one or more first parameters sent by the PCF.

In an eighth aspect, Data Analytics Function DAF is provided in some embodiments of the present disclosure. The DAF includes: a fourth receiving module, configured to receive packet delay data and one or more first parameters from Policy Control Function PCF, wherein the one or more first parameters are configured to represent one or more time-related parameters that need to be referred to for obtaining the delay jitter; a processing module, configured to obtain the packet delay jitter according to the packet delay data and the one or more first parameters; a third sending module, configured to send the packet delay jitter to the PCF.

In a ninth aspect, Data Analytics Function DAF is provided in some embodiments of the present disclosure, DAF includes: a third transceiver and a third processor; wherein the third transceiver is configured to receive and transmit data under control of the third processor; the third processor is configured to invoke a program in a memory and perform the following: receiving packet delay data and one or more first parameters from Policy Control Function PCF, wherein the one or more first parameters are configured to represent one or more time-related parameters that need to be referred to for obtaining the delay jitter; obtaining the packet delay jitter according to the packet delay data and the one or more first parameters; sending the packet delay jitter to the PCF.

In a tenth aspect, a communication network element is further provided in some embodiments of the present disclosure. The communication network element includes: a processor, a memory and a program stored on the memory and executable on the processor, wherein when the program is executed by the processor, the processor implements steps of the method of monitoring packet delay jitter according to the first aspect, the second aspect, or the third aspect.

In an eleventh aspect, a computer readable storage medium is provided in some embodiments, wherein a computer program is stored on the computer readable storage medium, and when the computer program is executed by a processor, the processor implements the steps of the method of monitoring packet delay jitter according to the first aspect, the second aspect, or the third aspect.

In some embodiments of the disclosure, the core network may obtain the packet delay jitter.

BRIEF DESCRIPTION OF THE DRAWINGS

Various other advantages and benefits will become apparent to those of ordinary skill in the art upon reading the following detailed description of the preferred embodiments. The drawings are for the purpose of illustrating the preferred embodiments only and are not to be construed as limiting the disclosure. Also, the same reference numerals are used to denote the same parts throughout the drawings. In the drawings.

DETAILED DESCRIPTION

Figure 1:
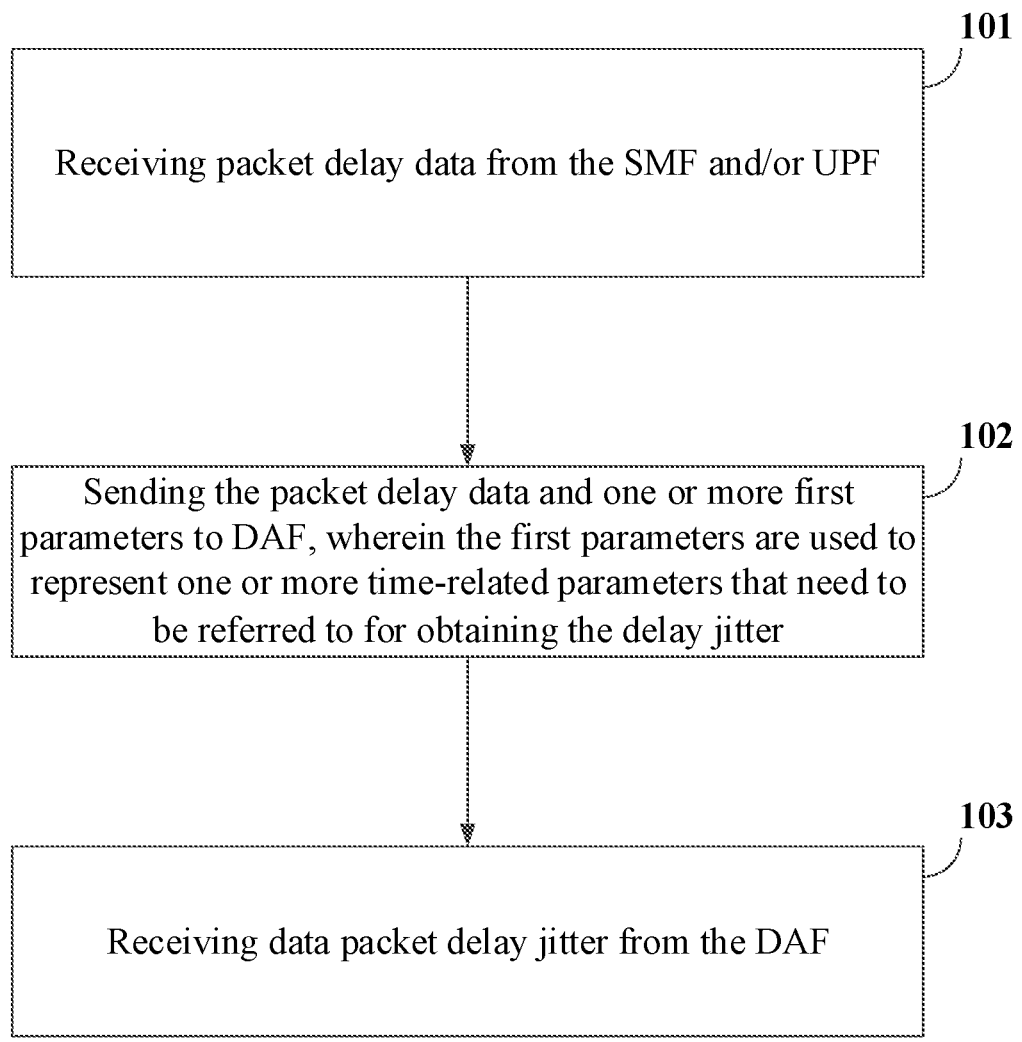
FIG. 1 is a first flowchart of a method of monitoring packet delay jitter according to some embodiments of the present disclosure.

In order to facilitate understanding of the embodiments of the present disclosure, the following is first described.

(1) Technical Terms

Application Function (AF) which is a network function of connecting an application with a 5G core network;
Network Exposure Function (NEF) which is a network function that exposes network information to applications;
Policy Control Function (PCF) which is a network function responsible for formulating a network policy;
Data Analytics Function (DAF) which is a network function responsible for network intelligence and network data analysis. In some standards, the DAF may also be called Network Data Analytics Function (NWDAF);
Session Management Function (SMF) which is a network function responsible for session management;
Access and Mobility Management Function (AMF) which is a network function responsible for access and mobility of a User Equipment (UE) and the like;
User Plane Function (UPF) which is also called a user plane network element;
Radio Access Network (RAN).

(2) Data Packet Delay Jitter data packet delay jitter is one of the most important parameters for evaluating network performance. Jitter is defined as "short-term deviation of each effective instant of a digital signal from a current ideal position of the digital signal". The packet delay jitter measures a delay variation characteristic, which is to perform data analysis processing on obtained packet delay data, and then to get a packet delay. Therefore, obtaining the packet delay jitter first needs to first measure the packet delay, and then perform the analysis processing to obtain the packet delay jitter.

(3) Quality of Service (QoS) Parameters evaluation metrics for the QoS parameters of a 5G core network include a packet delay budget, a packet error rate, a maximum data burst, an average window and so on, but the delay jitter of a network is not included.

As an important parameter for evaluating network stability, the packet delay jitter should be included in the evaluation metrics of the QoS parameters of the 5G core network. For example, for some scenarios that require high network stability, such as industrial manufacture of a high-precision instrument and remote surgical medical treatment, if the data packet delay jitter is large, then a network quality frequently changes, this may affect production in a factory and even endanger the safety of life.

Hereinafter, technical solutions in the embodiments of the present disclosure will be clearly and completely described with reference to the drawings in the embodiments of the present disclosure. It is obvious that the described embodiments are some embodiments of the present disclosure, but not all embodiments. Based on the embodiments in the present disclosure, all other embodiments obtained by those of ordinary skill in the art without creative labor fall within the protection scope of the present disclosure.

The term "comprising" and any variations thereof in the specification and claims of this application are intended to cover non-exclusive inclusions, for example, processes, methods, systems, products or devices comprising a series of steps or units need not to be limited to those steps or units clearly listed, but may include other steps or units not explicitly listed or inherent to these processes, methods, products or devices. In addition, "A and/or B" used in the specification and claims means at least one of the connected objects, such as A and/or B, indicating that there are three cases that A alone is included, B alone is included, and both A and B are included.

In the embodiments of the present disclosure, such words as "exemplary" or "such as" are used to denote examples, illustrations, or descriptions. Any embodiment or design described as "exemplary" or "such as" in the embodiments of the present disclosure should not be construed as being more preferred or advantageous than other embodiments or designs. Rather, the use of the words "exemplary" or "such as" is intended to present related concepts in a specific manner.

The techniques described herein are not limited to a fifth generation (5G) mobile communication system and a subsequent evolved communication system, and are not limited to a LTE-Advanced (LTE-A) system, and may also be used for various wireless communication systems, such as a Code Division Multiple Access (CDMA) system, a Time Division Multiple Access (TDMA) system, a Frequency Division Multiple Access (FDMA) system, an Orthogonal Frequency Division Multiple Access (OFDMA) system, a Single-Carrier Frequency-Division Multiple Access (SC-FDMA) system, and other systems.

The terms "system" and "network" are often used interchangeably. The CDMA system may implement radio technologies such as CDMA2000, Universal Terrestrial Radio Access (UTRA), and the like. The UTRA includes Wideband Code Division Multiple Access (WCDMA) and other CDMA variants. The TDMA system may implement a radio technology such as Global System for Mobile Communication (GSM). The OFDMA system may implement, for example, Ultra Mobile Broadband (UMB), an Evolution-UTRA (E-UTRA), IEEE 802.11 (Wi-Fi), IEEE 802.16 (WiMAX), IEEE 802.20, Flash-OFDM and other radio technologies. UTRA and E-UTRA are part of the Universal Mobile Telecommunications System (UMTS). LTE and more advanced LTE, such as LTE-A, are new UMTS versions that use E-UTRA. UTRA, E-UTRA, UMTS, LTE, LTE-A and GSM are described in literature from an organization named 3rd Generation Partnership Project (3GPP). CDMA2000 and UMB are described in literature from an organization named 3rd Generation Partnership Project 2 (3GPP2). Techniques described herein may be used for both the systems and the radio technologies mentioned above and for other systems and radio technologies.

A network element or a network entity corresponding to the term "terminal" may be a terminal in a 5G network; a network element or a network entity corresponding to an access device in a radio access network may be an access device in a 5G network; a network element or a network entity corresponding to a user plane may be User Plane Function network element in a 5G network, and a network element or a network entity corresponding to session management may be Session Management Function network element in a 5G network.

The terminal passes communicates with an AMF network element through Next Generation (N) network interface 1 (N1, for short), an access device communicates with the AMF network element through an N interface 2 (N2, for short), and an access device communicates with an UPF network element through an N interface 3 (N3). The AMF network element communicates with a SMF network element through an N interface 11 (N11), the AMF network element communicates with PCF network element through an N interface 15 (N15, for short), and the SMF network element communicates with the PCF network element through an N interface 7 (N7). The SMF network element communicates with a UPF network element through an N interface 4 (N4, for short).

In addition, it should be noted that control plane network elements such as the AMF network element, the SMF network element or the PCF network element in the 5G network may also interact with each other by using a service interface. For example, the service interface provided for outside by the AMF network element may be Namf, the service interface provided for outside by the SMF network element may be Nsmf, and the service interface provided for outside by the PCF network element may be Npcf. Related description may be obtained by referring to a diagram of a 5G system architecture in a Technical Specification TS 23.501, and will not be repeated here.

Optionally, the terminal referred to in embodiments of the present disclosure may include a variety of handheld devices onboard devices, wearable devices, computing devices, or other processing devices connected to a wireless modem, which have wireless communication capabilities; may also include a subscriber unit, a cellular phone, a smart phone, a wireless data card, a personal digital assistant (PDA), a tablet, a wireless modem, a handheld device, a laptop computer, a cordless phone or a wireless local loop (WLL) station, a machine type communication (MTC) terminal, a user equipment (UE), a mobile station (MS), a terminal device, or a relay user equipment. The relay user equipment may be, for example, a 5G residential gateway (RG). For convenience of description, in embodiments of the disclosure, the above-mentioned devices are collectively referred to as terminals.

Referring to FIG. 1, some embodiments of the present disclosure provide a method of monitoring data packet delay jitter, and an entity performing the method may be PCF, and the method includes step 101, step 102 and step 103.

Step 101: receiving packet delay data from the SMF and/or the UPF;

Step 102: sending the data packet delay data and one or more first parameters to the DAF, wherein the one or more first parameters are used to represent one or more time-related parameters that need to be referred for obtaining the delay jitter.

Step 103: receiving a data packet delay jitter from the DAF.

It can be understood that the data packet delay jitter cannot be directly measured, but can be obtained through first measuring the data packet delay to obtain a result of the data packet delay and then analyzing and calculating the obtained result of the data packet delay.

Relationship among the packet delay, the packet delay jitter and the first parameter (here, taking packet delay jitter measurement duration and packet delay jitter measurement frequency as examples) in the method provided by some embodiments of the present disclosure is described in detail below by way of an example.

For example, the data packet delay jitter measurement duration indicates that the AF wants to know the data packet delay jitter in a certain time duration, such as within 1 minute or within 10 minutes from a current time instant, a length of the measurement duration is not specifically limited.

For example, the packet delay jitter measurement frequency indicates how often the AF needs to obtain a packet delay within this time duration (for example, 10 minutes), such as once every 1 minute, or once every 2 minutes. Therefore, according to the above time duration and frequency, the number of measured results of the data packet delay can be obtained, that is, a length of an obtained data packet delay array is determined, thereby affecting a calculation result of data packet delay jitter.

For example, the time duration is 10 minutes, the frequency is once per minute, and 10 results [10, 5, 6, 8, 8, 9, 4, 10, 8, 8] are obtained. A unit of each result is ms, then an average of network delays measured during this duration is (10+5+6+8+8+9+4+10+8+8)/10=7.6 ms.

The data packet delay jitter is a maximum value of all deviations of the results from the average in the array, for example, the maximum value in the results in the array is 10, 10−7.6=2.4, and the deviation is 2.4; the minimum value in results in the array is 4, 7.6−4=3.6. Since 3.6 is greater than 2.4, the measured packet delay jitter during this time duration can be considered as 3.6 ms, but if the time duration is 10 minutes and the frequency is twice per minute, 5 results [10, 6, 8, 4, 8] are obtained, the average value is (10+6+8+4+8)/5=7.2, the maximum value in the results is 10, 10−7.2=2.8 and the minimum value in the results is 4, 7.2−4=3.2, so the jitter is 3.2 ms. It can be seen that for the same time duration, if different measurement frequencies is applied, the obtained packet delay jitters is also different.

It is apparent that performing a delay jitter obtaining operation needs to go through a number of steps. Therefore, "performing the delay jitter obtaining operation in step 102 represents an entire process of obtaining the delay jitter, including a start of performing the delay jitter obtaining operation, intermediate steps that need to be performed (for example, measuring data packet delays) for performing the delay jitter obtaining operation and a final result of obtaining the delay jitter.

It should be noted that the entire process of performing the delay jitter obtaining operation may be completed by one network entity, or may be completed by multiple network entities cooperating together. It can be understood that in the case where multiple network entities cooperate together, some network entities perform signaling transmission or parameter delivery, and some network entities obtains and transmits intermediate results. Some network entities calculate or analyze the obtained intermediate results. The entire process of obtaining the delay jitter is completed by cooperation of all network entities.

Furthermore, the time-related parameters that need to be referred to when performing the delay jitter obtaining operation in step 102 may represent time-related parameters that need to be referred to in the entire process of performing the delay jitter obtaining operation. That is, the time-related parameters that need to be referred to when obtaining the delay jitter in step 102 may include time-related parameters that need to be referred to when obtaining the intermediate results, and may also include time-related parameters that need to be referred to when obtaining the final result.

In the entire process of performing the delay jitter obtaining operation, some network entities need to clearly know time instants of some operations when performing the operations, and the time instants of operations can be directly or indirectly known through the "time-related parameters" here. For example, if one certain NF or some certain NFs need to measure the packet delays to obtain packet delay data, then the NF or the NFs can know when delay measurement needs to be performed through the "time-related parameters" here.

Optionally, the time-related parameters herein may be at least one of the data packet delay jitter measurement duration, the data packet delay jitter measurement frequency and the number of data packet delay jitter measurement times. For example, some NFs or a certain NF needs to measure the data packet delays, and then the NF or the NFs may know when to start the measurement, how often to perform another measurement after the measurement is started, and when to stop the measurement, through the data packet delay jitter measurement time duration and the data packet delay jitter measurement frequency. Of course, the same purpose can also be achieved by two time-related parameters, namely, the packet delay jitter measurement time duration and the number of the packet delay jitter measurement times.

It should be noted that the above three parameters are only optional embodiments of the first parameters provided by the present disclosure, and in actual cases, the skilled person in the art may also select other first parameters according to actual needs. The selected other first parameters are within the protection scope of the present disclosure as long as the parameters enable certain network entities to directly or indirectly know time instants of performing operations.

Optionally, before step 101, the method provided by the embodiments of the present application further includes: receiving a first request sent by the NEF or the AF, the first request being used to request to perform the delay jitter obtaining operation, the first request includes the one or more first parameters.

It should be noted that the request for the PCF to perform a delay jitter obtaining operation here does not mean that the PCF itself performs the delay jitter obtaining operation. As described above, the "delay jitter obtaining operation" may be performed by cooperation of multiple network entities through multiple steps. In this case, the PCF only plays a role of sending signaling and parameters to subsequent network elements.

Optionally, after step 103, the method provided by the embodiments of the present application further includes sending the data packet delay jitter to the NEF or the AF.

It should be noted that the monitoring in the embodiments of the present application may also be replaced by "detecting" or "probing", that is, the monitoring and the "detecting" or "probing" may be replaced by each other, which is described herein in a unified manner, and is not repeated below.

In some embodiments of the disclosure, obtaining the packet delay jitter by the core network may be implemented.

Figure 2:
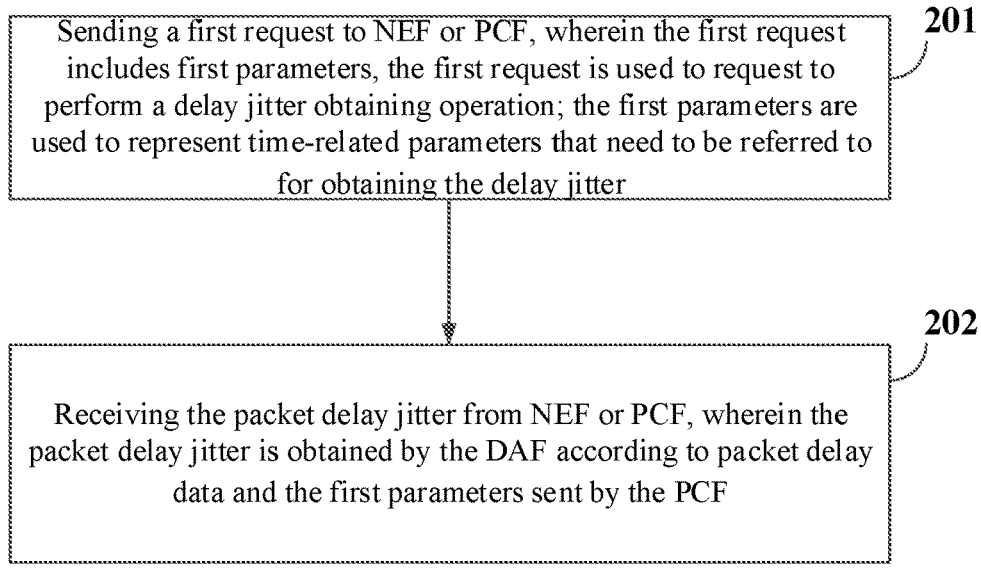
FIG. 2 is a second flowchart of a method of monitoring packet delay jitter according to some embodiments of the present disclosure.

Referring to FIG. 2, some embodiments of the present disclosure provide a method of monitoring a data packet delay jitter, and an entity performing the method may be the AF, and the method includes a step 201 and a step 202.

Step 201: sending a first request to the NEF or the PCF, wherein the first request includes one or more first parameters, wherein the first request is used to request to perform a delay jitter obtaining operation. The one or more first parameters are used to represent one or more time-related parameters that need to be referred to when obtaining the delay jitter;

Step 202: receiving the data packet delay jitter from the NEF or the PCF, wherein the data packet delay jitter is obtained by the DAF according to packet delay data sent by the PCF and the one or more first parameters sent by the PCF.

Here, the first request can be implemented in many ways.

For example, the first request may be a QoS monitoring request. The QoS monitoring request is sent to the NEF or the PCF, the QoS monitoring request carries the first parameter. A specified value of a specified field in the QoS monitoring request may indicate that the delay jitter obtaining operation is requested. When the NEF or the PCF receives the QoS monitoring request and parses that the specified field in the request is the specified value, the NEF or the PCF may determine that the current request is used for the delay jitter obtaining operation.

For another example, the first request may be a service request other than the QoS monitoring request. The service request may be a newly configured service request in the network.

Optionally, a specified value of a specified field in the service request is used to indicate that the delay jitter obtaining operation is requested, and when the NEF or PCF receives the service request and parses that the specified field in the request is the specified value, it is determined that the request is used to indicate that the delay jitter obtaining operation is requested. Optionally, the service request itself may be used to indicate that the delay jitter obtaining operation is requested, and the NEF or PCF may determine that the delay jitter obtaining operation is to be performed as long as the service request is received.

It can be understood that the above are only several optional embodiments of the first request, and in actual cases, the skilled person in the art can configure a suitable first request according to actual needs, this is within the protection scope of the present disclosure as long as the request is used to request the delay jitter obtaining operation.

It should also be noted that the AF in some embodiments of the present disclosure may send the first request to the NEF or to the PCF. Which specific network entity the first request is sent to depends on whether the AF itself is a trusted entity. If the AF is the trusted entity, the first request can be directly sent to the PCF; or, if trustability of the AF is not confirmed, the first request needs to be sent to the NEF, and the NEF authorizes the first request and then forwards the first request to the PCF.

In some embodiments of the disclosure, obtaining the packet delay jitter by the core network may be implemented.

Figure 3:
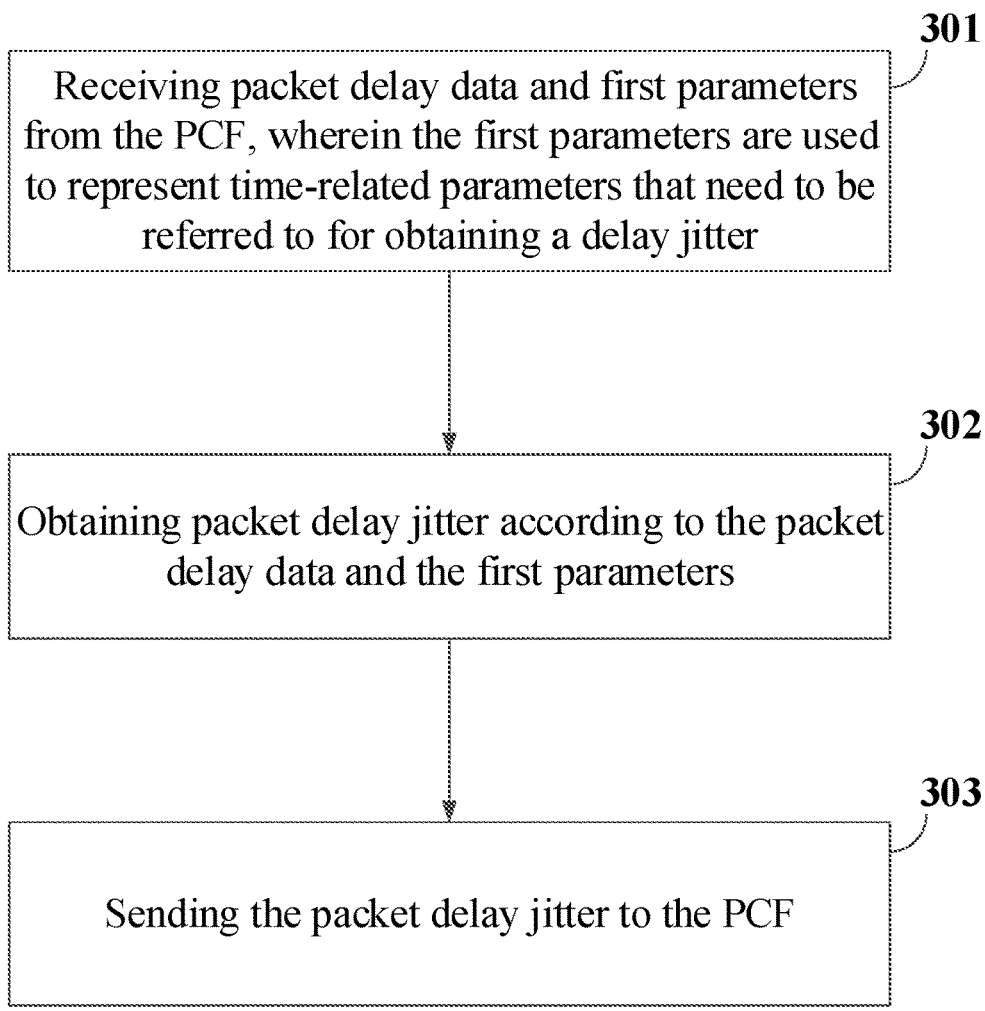
FIG. 3 is a third flowchart of a method of monitoring packet delay jitter according to some embodiments of the present disclosure.

Referring to FIG. 3, some embodiments of the present disclosure provide a method of monitoring a data packet delay jitter, an entity performing the method may be DAF, and the method includes a step 301, a step 302, and a step 303.

Step 301: receiving packet delay data and one or more first parameters from the PCF, wherein the one or more first parameters are used to represent one or more time-related parameters that need to be referred to in order to obtain a delay jitter.

Step 302: obtaining packet delay jitter according to the packet delay data and the one or more first parameters.

Step 303: sending the packet delay jitter to the PCF.

Here, in step 302, obtaining the packet delay jitter according to the packet delay data and the one or more first parameters may specifically be to obtaining a maximum value of all deviations, from an average delay, of data in the array according to a packet delay data array and the one or more first parameters. A specific example has been given to illustrate how to obtain the packet delay jitter in the preceding part, and will not be described here.

In some embodiments of the disclosure, obtaining the packet delay jitter by the core network may be implemented.

Figure 4:
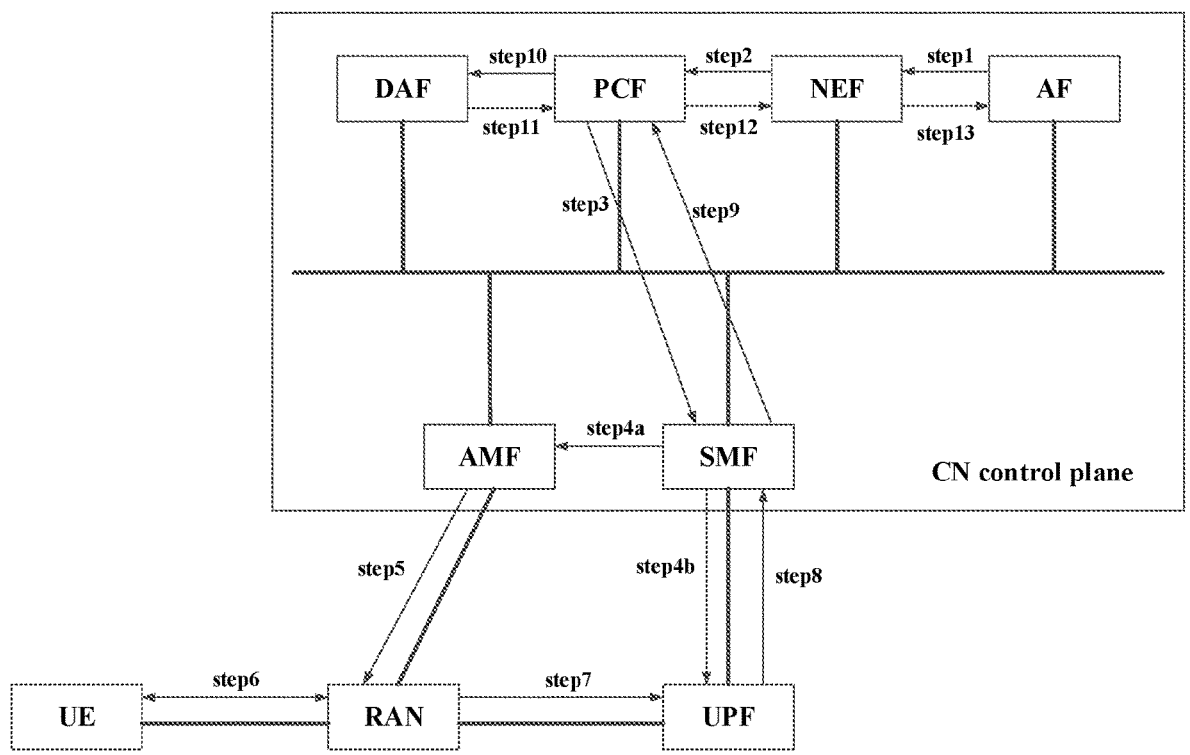
FIG. 4 is a fourth flowchart of a method of monitoring packet delay jitter according to some embodiments of the present disclosure.
Figure 5:
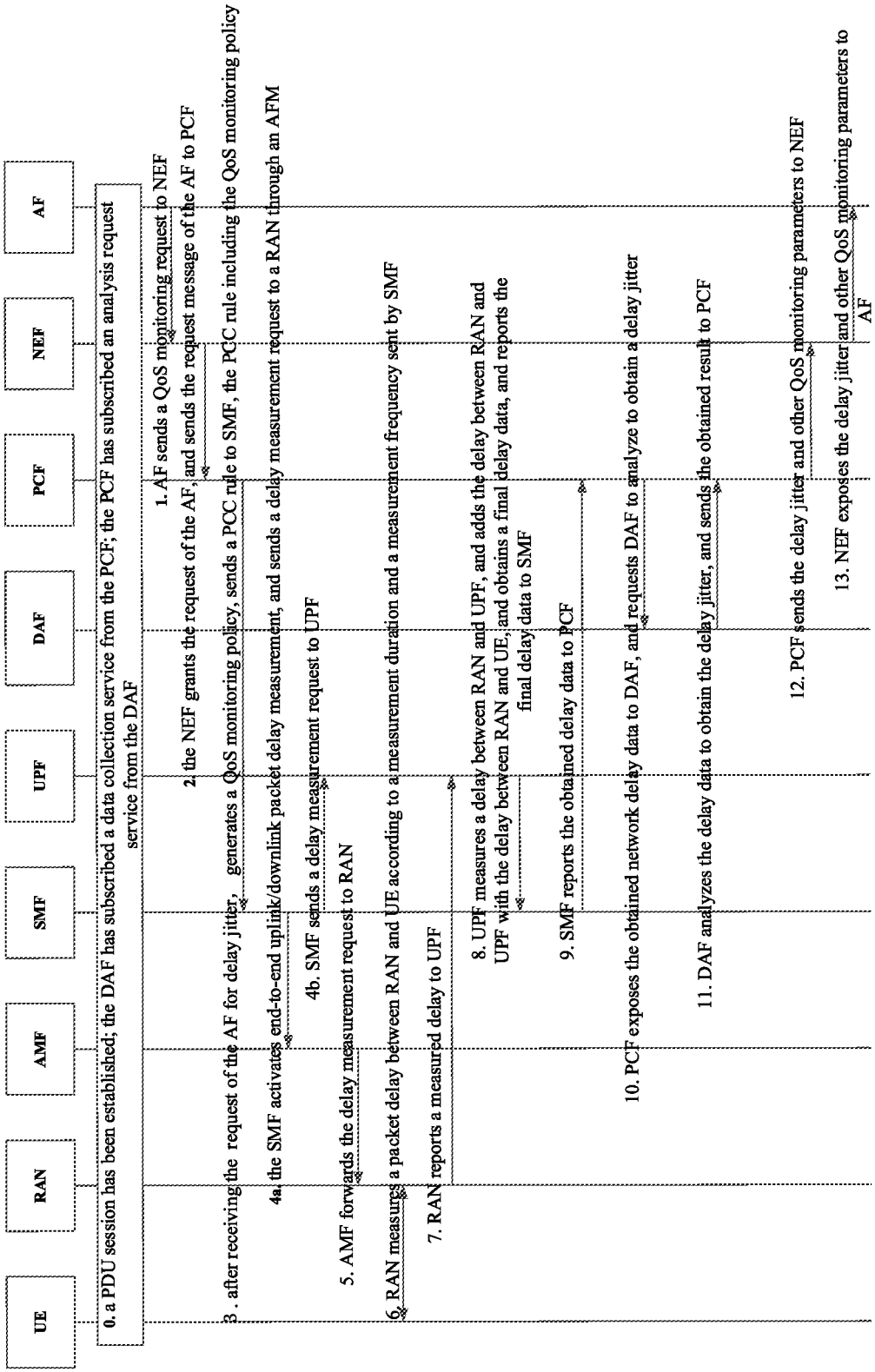
FIG. 5 is a fifth flowchart of a method of monitoring packet delay jitter according to some embodiments of the present disclosure.

Referring to FIG. 4 and FIG. 5, some embodiments of the present disclosure further provide a method of monitoring a data packet delay jitter, and specific steps in the method are as follows:

Step 0: a PDU session has been established; the DAF has subscribed a data collection service from the PCF; the PCF has subscribed an analysis request service from the DAF;

Step 1: the AF sends a first message to the NEF, where the first message is used for requesting QoS monitoring;

For example, the first message is a QoS monitoring request message, or an Nnef_AFsessionWithQoS_Create message.

Optionally, the first message may carry one or more of the following: packet delay jitter measurement duration, packet delay jitter measurement frequency, and a quantity of packet delay jitter measurement times.

Optionally, the first message includes a UE address, an AF identifier, a flow description, a QoS reference, and the like.

It will be appreciated that the packet delay jitter measurement duration may reuse a QoS monitoring duration.

Step 2: the NEF grants the request of the AF, and sends a second message to the PCF, where the second message is used to request the QoS monitoring.

For example, the second message is an Npcf_PolicyAuthorization_Create message.

Optionally, the second message may carry one or more of the following items: the packet delay jitter measurement duration, the packet delay jitter measurement frequency, and the number of packet delay jitter measurement times.

Step 3: after receiving the second message, the PCF generates a granted QoS monitoring policy for a service data flow, and sends a third message to the SMF; the third message includes the packet delay jitter measurement duration and the packet delay jitter measurement frequency.

For example, the third message may be an Npcf_SMPolyControl_UpdateNotify message.

The PCF sends the third message to trigger the SMF to initiate a session modification procedure, wherein the third message includes a Policy and Charging Control (PCC) rule provided by the PCF to the SMF, and the PCC rule includes a QoS monitoring policy which includes the packet delay jitter measurement time duration and the packet delay jitter measurement frequency.

Step 4a: the SMF activates end-to-end uplink/downlink packet delay measurement, and sends a packet delay measurement request to a RAN through AFM.

For example, the SMF activates the end-to-end uplink/downlink packet delay measurement between a UE and an anchor UPF in the session modification procedure, sends a Namf_Communication_N1N2MessageTransfer message to the AMF, and then the AMF sends a fourth message to a NG-RAN (Next-Gen Radio Access Network) through a N2 interface. The fourth message is used for requesting to measure the data packet delay, and the fourth message carries the packet delay jitter measurement time duration and the packet delay jitter measurement frequency.

Step 4b: the SMF sends a fifth message to the UPF, where the fifth message is used to request to measure the packet delay.

For example, the SMF activates the end-to-end uplink/downlink data packet delay measurement between the UE and the anchor UPF in the session modification procedure, and sends the fifth message (such as a N4 Session Modification Request message) through the N4 interface to the UPF which serves as the PDU session anchor, the fifth message carries the packet delay jitter measurement time duration and the packet delay jitter measurement frequency, that is, the UPF is instructed to obtain the data packet delay according to the packet delay jitter measurement duration and the packet delay jitter measurement frequency.

Step 5: the AMF sends a sixth message to the RAN, where the sixth message is used to request to measure the packet delay.

For example, the AMF sends a sixth message to the RAN through an N2 message, the sixth message carries the packet delay jitter measurement time duration and the packet delay jitter measurement frequency. That is, the NG-RAN is instructed to obtain the packet delay according to the packet delay jitter measurement time duration and the packet delay jitter measurement frequency.

Step 6: the RAN measures a first packet delay between the UE and the RAN according to the packet delay jitter measurement duration and the packet delay jitter measurement frequency.

Step 7: the RAN reports the measured first packet delay to the UPF.

For example, the RAN sends the measured UL/DL packet delay of a Uu interface to the UPF as uplink packet data.

Step 8: the UPF measures a second packet delay between the RAN and the UPF, the first packet delay and the second packet delay are added together to obtain the final packet delay data, and reports the final packet delay data to the SMF.

For example, the final packet delay is reported to the SMF by sending an N4 Session Modification Response message.

Step 9: the SMF reports the final packet delay data to the PCF.

For example, the SMF reports the obtained packet delay data to the PCF through an Npcf_SMPolyControl_UpdateNotify response message.

Step 10: the PCF sends a seventh message to the DAF, wherein the seventh message is used for requesting the DAF to analyze the final packet delay data.

For example, after the PCF obtains the final packet delay data, the PCF exposes the final packet delay data to the DAF, and sends Data Analytics Function message analysis request to the DAF, and the DAF performs analysis on the packet delay data, and obtains the packet delay jitter.

Step 11: the DAF sends an eighth message to the PCF, wherein the eighth message includes the packet delay jitter obtained by the DAF through analyzing the final packet delay data.

For example, the DAF analyzes the final packet delay data to obtain the packet delay jitter, and sends the obtained packet delay jitter to the PCF through a response to the data analysis function message analysis request.

Step 12: the PCF send the packet delay jitter to the NEF.

For example, the PCF sends the packet delay jitter and other QoS monitoring data to the NEF via Npcf_PolicyAuthorization_Notify.

Step 13: the NEF sends the packet delay jitter to the AF.

For example, the NEF sends the packet delay jitter and other QoS monitoring data to the AF via Nnef_AFsessionWithQoS_Notify.

Figure 6:
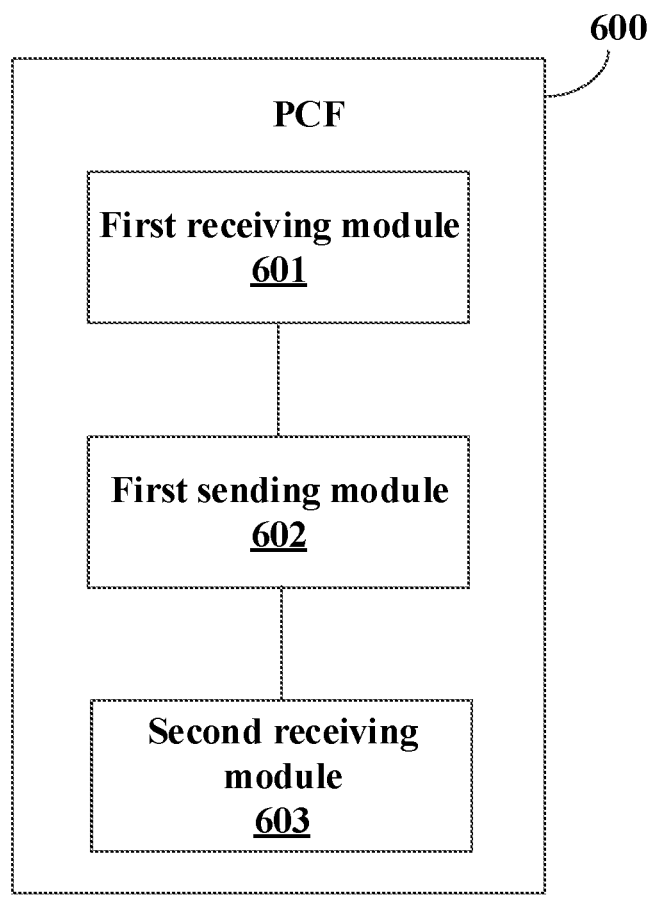
FIG. 6 is a first schematic diagram of PCF according to some embodiments of the present disclosure.

Referring to FIG. 6, some embodiments of the present disclosure also provide PCF, the PCF 600 includes: a first receiving module 601, configured to receive packet delay data from the SMF and/or the UPF; a first sending module 602, configured to send the data packet delay data and one or more first parameters to the Data Analytics Function (DAF), wherein the one or more first parameters are used to represent one or more time-related parameters that need to be referred to for obtaining the delay jitter; a second receiving module 603, configured to receive the data packet delay jitter from the DAF.

In some embodiment, the PCF 600 further includes: a third receiving module, configured to receive a first request sent by the NEF or the AF, the first request being used to request to perform the delay jitter obtaining operation, the first request includes the one or more first parameters.

In some embodiments, the one or more first parameters include at least one of the following: packet delay jitter measurement duration, packet delay jitter measurement frequency, and the number of packet delay jitter measurement times.

In some embodiments, the PCF 600 further includes: a second sending module, configured to send the packet delay jitter to Network Exposure Function (NEF) or an Application Function (AF).

The PCF provided by some embodiments of the present disclosure can execute the method embodiment shown in FIG. 1, and implementation principles and technical effects implemented by the PCF and in the method embodiment are similar, and are not repeated here in the embodiment.

Figure 7:
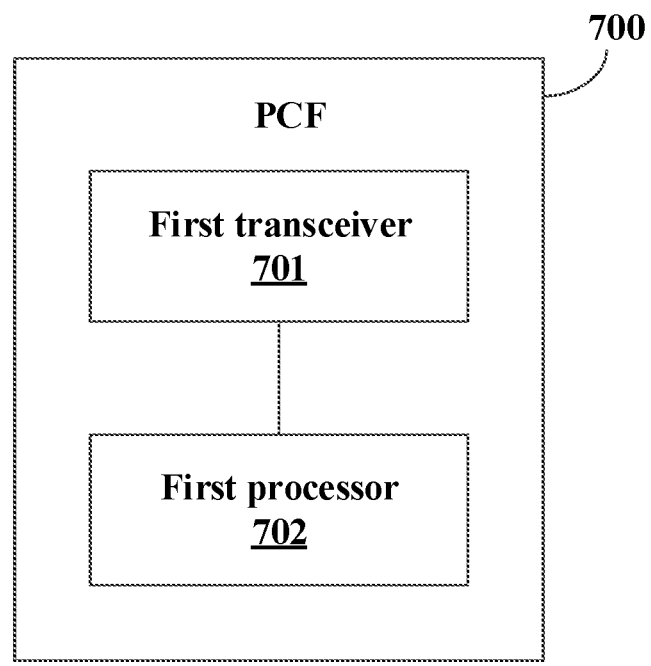
FIG. 7 is a second schematic diagram of PCF according to some embodiments of the present disclosure.

Referring to FIG. 7, some embodiments of the present disclosure also provide PCF 700 including a first transceiver 701 and a first processor 702.

The first transceiver 701 is configured to receive and transmit data under the control of the first processor 702.

The first processor 702 is configured to invoke the program stored in a memory to perform the following steps: receiving the packet delay data from the Session Management Function SMF and/or the User Plane Function UPF; sending the packet delay data and one or more first parameters to the Data Analytics Function DAF, wherein the one or more first parameters are used to represent one or more time-related parameters that need to be referred to for obtaining the delay jitter, and receiving the packet delay jitter from the DAF.

In some embodiment, when the first processor 702 invokes the program in the memory, the first processor 702 further performs the follow steps: receiving a first request sent by the NEF or the AF, the first request is used to request to perform a delay jitter obtaining operation, the first request includes the one or more first parameters.

In some embodiments, the first parameter includes at least one of the following: the packet delay jitter measurement duration, the packet delay jitter measurement frequency, and the number of packet delay jitter measurement times.

In some embodiment, when the first processor 702 invokes the program in the memory, the first processor 702 further performs the follow step: sending the packet delay jitter to the NEF or the AF.

The PCF provided by some embodiments of the present disclosure may execute the method embodiment shown in FIG. 1, and implementation principles and technical effects of the PCF and the method embodiment are similar, and are not repeated herein.

Figure 8:
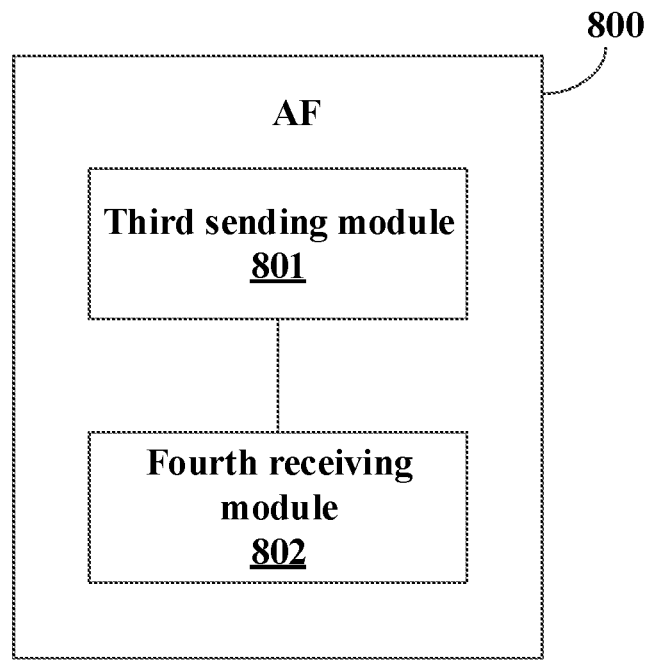
FIG. 8 is a first schematic diagram of AF according to some embodiments of the present disclosure.

Referring to FIG. 8, some embodiments of the present disclosure also provide AF 800. The AF 800 includes: a third sending module 801, configured to send a first request to an NEF or PCF, wherein the first request includes one or more first parameters, wherein the first request is configured to request to perform a delay jitter obtaining operation, the one or more first parameters are used to represent one or more time-related parameters that need to be referred to for obtaining the delay jitter; a fourth receiving module 802, configured to receive the packet delay jitter from the NEF or the PCF, where the packet delay jitter is obtained by the DAF according to the packet delay data sent by the PCF and the one or more first parameters sent by the PCF.

In some embodiments of the present disclosure, the first request is a quality of service (QoS) monitoring request, and a specified value of a specified field in the QoS monitoring request is used to indicate that performing a delay jitter obtaining operation is requested.

In some embodiments of the present disclosure, the first request is a service request other than the QoS monitoring request; the specified value of the specified field in the service request is used to indicate that performing the delay jitter obtaining operation is requested, or the service request itself is used to indicate that performing the delay jitter obtaining operation is requested.

In some embodiments of the present disclosure, the one or more first parameters are at least one of the following: the packet delay jitter measurement duration, the packet delay jitter measurement frequency, and the number of packet delay jitter measurement times.

The AF provided by some embodiments of the present disclosure may implement the method embodiment shown in FIG. 2, and implementation principles and technical effects of the AF and the method methods are similar, and will not repeated herein.

Figure 9:
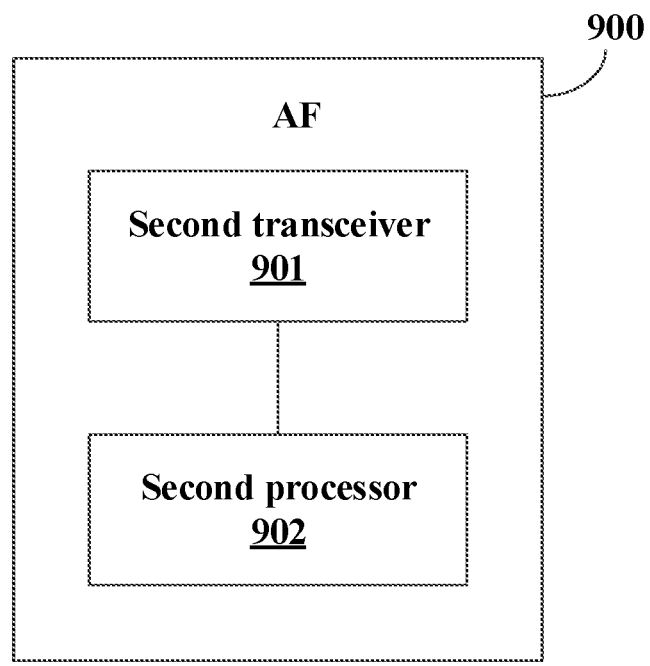
FIG. 9 is a second schematic diagram of AF according to some embodiments of the present disclosure.

Referring to FIG. 9, some embodiments of the present disclosure also provide AF 900. The AF 900 includes a second transceiver 901 and a second processor 902.

The second transceiver 901 is configured to receive and transmit data under the control of the second processor 902.

The second processor 902 is configured to invoke a program in a memory and performs the following: sending a first request to the NEF or the PCF, wherein the first request includes one or more first parameters, the first request is configured to request to perform a delay jitter obtaining operation, the one or more first parameters are configured to indicate one or more time-related parameters that need to be referred to in order to obtain the delay jitter; receiving packet delay jitter from the NEF or the PCF, wherein the packet delay jitter is obtained by the DAF according to the packet delay data sent by the PCF and the one or more first parameters sent by the PCF.

In some embodiments of the present disclosure, the first request is a quality of service (QoS) monitoring request, and a specified value of a specified field in the QoS monitoring request is configured to indicate that performing a delay jitter obtaining operation is requested.

In some embodiments of the disclosure, the first request is a service request other than a QoS monitoring request, and a specified value of a specified field in the service request is configured to indicate that performing a delay jitter obtaining operation is requested, or, the service request itself is configured to indicate that performing a delay jitter obtaining operation is requested.

In some embodiments of the present disclosure, the one or more first parameters are at least one of the following: the packet delay jitter measurement duration, the packet delay jitter measurement frequency, and the number of packet delay jitter measurement times.

The AF provided by some embodiments of the present disclosure can execute the method embodiment shown in FIG. 2, and implementation principles and technical effects of the AF and the method embodiment are similar, and are not repeated herein.

Figure 10:
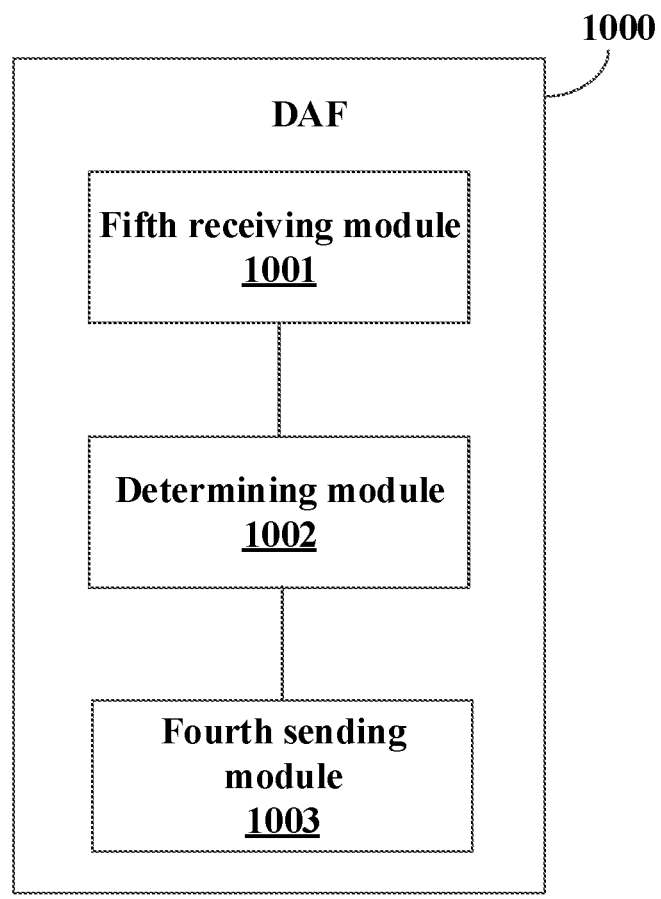
FIG. 10 is a first schematic diagram of DAF according to some embodiments of the present disclosure.

Referring to FIG. 10, some embodiments of the present disclosure also provide DAF, the DAF 1000 includes: a fifth receiving module 1001, configured to receive packet delay data and one or more first parameters from the PCF, wherein the one or more first parameters are used to represent one or more time-related parameters that need to be referred to in order to obtain a delay jitter; a processing module 1002, configured to obtain packet delay jitter according to the packet delay data and the one or more first parameters; a fourth sending module 1003, configured to send the packet delay jitter to the PCF.

In some embodiments of the present disclosure, the one or more first parameters are at least one of the following: the packet delay jitter measurement duration, the packet delay jitter measurement frequency, and the number of packet delay jitter measurement times.

The DAF provided by some embodiments of the present disclosure can execute the method embodiment shown in FIG. 3, and implementation principles and technical effects of the DAF and the method embodiment are similar, and will not be repeated here.

Figure 11:
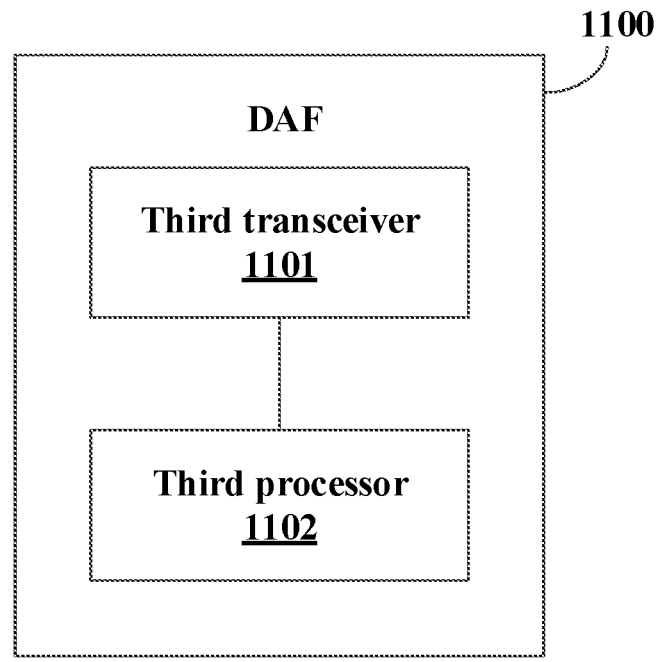
FIG. 11 is a second schematic diagram of DAF according to some embodiments of the present disclosure.

Referring to FIG. 11, some embodiments of the present disclosure also provide DAF, the DAF 1000 includes a third transceiver 1101 and a third processor 1102.

The third transceiver 1101 is configured to receive and transmit data under the control of the third processor 1102.

The third processor 1102 is configured to invoke a program stored in a memory to perform the following steps: receiving the packet delay data and the one or more first parameters from the PCF, wherein, the one or more first parameters are used to represent one or more time-related parameters that need to be referred to in order to obtain a delay jitter, and according to the packet delay data and the one or more first parameters, obtaining the packet delay jitter; and sending the packet delay jitter to the PCF.

The DAF provided by some embodiments of the present disclosure can execute the method embodiment shown in FIG. 3, and implementation principle and technical effects of the DAF and the method embodiment are similar, and will not be repeated here.

Figure 12:
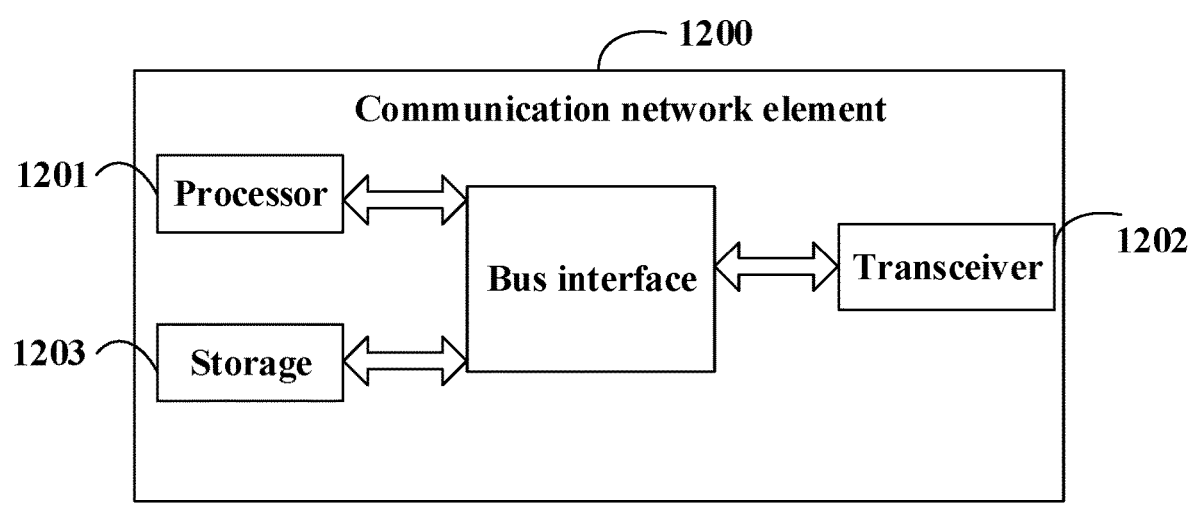
FIG. 12 is a schematic diagram of a communication network element according to some embodiments of the present disclosure.

Referring to FIG. 12. FIG. 12 is a structural diagram of a communication network element according to some embodiments of the present disclosure. As shown in FIG. 12, the communication network element 1200 includes a processor 1201, a transceiver 1202, a memory 1203 and a bus interface.

In one embodiment of the present disclosure, the communication network element 1200 further includes a computer program stored on the memory 1203 and executable by the processor 1201. When the computer program is executed by the processor 1201, the processor 1201 implements the steps in the embodiments shown in FIGS. 1-3.

In FIG. 12, a bus architecture may include any number of interconnected buses and bridges. Specifically, various circuits such as one or more processors represented by the processor 1201 and a memory represented by the memory 1203 are linked together. A bus architecture may also link together various other circuits, such as peripherals, voltage regulators, and power management circuits, all of which are well known in the art and thus will not be described further herein. The bus interface provides an interface. The transceiver 1202 may be a number of elements, i.e., including a transmitter and a receiver, for providing means for communicating with various other devices over a transmission medium.

The processor 1201 is responsible for managing the bus architecture and general processing, and the memory 1203 may store data used by the processor 1201 in performing operations.

The communication network element provided by some embodiments of the present disclosure may execute the method embodiments shown in FIGS. 1-3, and implementation principles and technical effects of the communication network element and the method embodiments are similar, and will not be repeated herein.

The steps of the methods or algorithms described in connection with the present disclosure may be implemented in hardware or may be implemented by executing software instructions on a processor. The software instructions may consist of corresponding software modules. The software modules may be stored in a RAM, a flash memory, a ROM, an EPROM, an EEPROM, a register, a hard disk, a removable hard disk, a read only optical disk, or any other form of storage medium well known in the art. An exemplary storage medium is coupled to the processor such that the processor can read information from the storage medium and can write information to the storage medium. Of course, the storage medium may also be an integral part of the processor. The processor and the storage medium may be carried in a ASIC. In addition, the ASIC may be carried in a core network interface device. Of course, the processor and the storage medium may also exist as separate components in the core network interface device.

Those skilled in the art will appreciate that in one or more of the examples described above, the functions described in the present disclosure may be implemented in hardware, software, firmware, or any combination thereof. When implemented using software, these functions may be stored in or transmitted as one or more instructions or codes on a computer-readable medium. Computer readable media include a computer storage medium and a communication medium, wherein the communication medium includes any medium that facilitates transfer of computer programs from one place to another. The storage medium may be any available medium that a general purpose or special purpose computer can access.

It will be appreciated that the embodiments described in the present disclosure may be implemented in hardware, software, firmware, middleware, microcode, or combinations thereof. In case of being implemented in hardware, modules, units, sub-modules, sub-units, and the like may be implemented in one or more of Application Specific Integrated Circuits (ASIC), Digital Signal Processing (DSP), DSP Devices (DSPDs), Programmable Logic Devices (PLDs), Field-Programmable Gate Array (FPGAs), general purpose processors, controllers, microcontrollers, microprocessors, other electronic units for performing the functions described in this disclosure, or combinations thereof.

The objects, technical solutions and advantageous effects of the present disclosure are further described in detail in the above specific embodiments, and it should be understood that the above are only specific embodiments of the present disclosure, but are not intended to limit the protection scope of the disclosure, and any modification, equivalent replacement, improvement, etc. made on the basis of the technical solutions of the disclosure should be included in the protection scope of the disclosure.

Those skilled in the art will appreciate that the embodiments of the present disclosure may be provided as methods, systems, or computer program products. Accordingly, the embodiments of the present disclosure may take the form of an entire hardware embodiment, an entire software embodiment, or an embodiment combining software and hardware aspects. Embodiments of the present disclosure may employ a form of a computer program product implemented on a computer usable storage medium (including, but not limited to, a disk storage, a CD-ROM, an optical memory or the like).

Embodiments of the present disclosure are described with reference to flow diagrams and/or block diagrams of methods, apparatus (systems), and computer program products according to the embodiments of the disclosure. It should be understood that each of the flows in the flow charts and/or each block in the block diagrams, and combinations of the flows in the flow charts and blocks in the block diagrams, may be implemented by computer program instructions. These computer program instructions may be provided to a processor of a general purpose computer, a special purpose computer, an embedded processor, or other programmable data processing device to produce a machine, so that instructions to be executed by a processor of a computer or other programmable data processing device produce a device for implementing the functions specified in one or more flows of the flowcharts and one or more blocks of the block diagrams.

The computer program instructions may also be stored in a computer readable memory capable of directing a computer or other programmable data processing device to operate in a particular manner, so that the instructions stored in the computer-readable memory to produce an article of manufacture including an instruction device. The instruction devices implements the functions specified in one or more flows in the flow charts and/or one or more blocks of the block diagrams.

The computer program instructions may also be loaded on a computer or other programmable data processing device, so that a series of operational steps are executed on the computer or other programmable data processing device to procedure a computer-implemented processing operation, and the instructions executed on the computer or other programmable device implements the functions specified in one or more flows in the flow charts and/or one or more blocks of the block diagrams.

It will be apparent to those skilled in the art that various changes and modifications may be made to the embodiments of the present disclosure without departing from the spirit and scope of the disclosure. As such, the present disclosure is also intended to include such changes and modifications made to the embodiments of the present disclosure, provided such changes and modifications fall within the scope of the claims of the present disclosure and their equivalents.

What is claimed is:

1. A method of monitoring packet delay jitter, the method being performed by Policy Control Function PCF, the method comprising:
    receiving packet delay data from Session Management Function SMF and/or User Plane Function UPF;
    sending the packet delay data and one or more first parameters to Data Analytics Function DAF, wherein the one or more first parameters are configured to represent one or more time-related parameters that need to be referred to for obtaining the delay jitter;
    receiving the packet delay jitter from the DAF.

2. The method according to claim 1, further comprising:
    receiving a first request sent by Network Exposure Function NEF or Application Function AF, wherein the first request is configured to request to perform a delay jitter obtaining operation, and the first request comprises the one or more first parameters.

3. The method according to claim 1, wherein the one or more first parameters comprise at least one of following:
    packet delay jitter measurement duration, packet delay jitter measurement frequency, and a quantity of packet delay jitter measurement times.

4. The method according to claim 1, further comprising:
    sending the packet delay jitter to Network Exposure Function NEF or Application Function AF.

5. Policy Control Function PCF, comprising:
    a processor, a memory and a program stored on the memory and executable on the processor, wherein when the program is executed by the processor, the processor implements steps of the method of monitoring packet delay jitter according to claim 1.

6. The PCF according to claim 5, wherein, when the program is executed by the processor, the processor further implements:
    receiving a first request sent by Network Exposure Function NEF or Application Function AF, wherein the first request is configured to request to perform a delay jitter obtaining operation, and the first request comprises the one or more first parameters.

7. The PCF according to claim 5, wherein, the one or more first parameters comprise at least one of following:
    packet delay jitter measurement duration, packet delay jitter measurement frequency, and a quantity of packet delay jitter measurement times.

8. The PCF according to claim 5, wherein, when the program is executed by the processor, the processor further implements:
    sending the packet delay jitter to Network Exposure Function NEF or Application Function AF.

9. A method of monitoring packet delay jitter, the method being performed by Application Function AF, the method comprising:
    sending a first request to Network Exposure Function NEF or Policy Control Function PCF, wherein the first request comprises one or more first parameters, the first request is configured to request to perform a delay jitter obtaining operation, the one or more first parameters are configured to represent one or more time-related parameters that need to be referred to for obtaining the delay jitter;
    receiving the packet delay jitter from the NEF or the PCF, wherein the packet delay jitter is obtained by Data Analytics Function DAF according to packet delay data sent by the PCF and the one or more first parameters sent by the PCF.

10. The method according to claim 9, wherein,
    the first request is a Quality of Service QoS monitoring request, and a specified value of a specified field in the QoS monitoring request is configured to indicate that performing a delay jitter obtaining operation is requested.

11. The method according to claim 9, wherein,
    the first request is a service request other than a Quality of Service QoS monitoring request;
    a specified value of a specified field in the service request is configured to indicate that performing a delay jitter obtaining operation is requested, or the service request is configured to indicate that performing the delay jitter obtaining operation is requested.

12. The method according to claim 9, wherein, the one or more first parameters are at least one of:
    packet delay jitter measurement duration, packet delay jitter measurement frequency, and a quantity of packet delay jitter measurement times.

13. Application Function AF, comprising:
    a processor, a memory and a program stored on the memory and executable on the processor, wherein when the program is executed by the processor, the processor implements steps of the method of monitoring packet delay jitter according to claim 9.

14. The AF according to claim 13, wherein, the first request is a Quality of Service QoS monitoring request, and a specified value of a specified field in the QoS monitoring request is configured to indicate that performing a delay jitter obtaining operation is requested.

15. The AF according to claim 13, wherein, the first request is a service request other than a Quality of Service QoS monitoring request;

a specified value of a specified field in the service request is configured to indicate that performing a delay jitter obtaining operation is requested, or the service request is configured to indicate that performing the delay jitter obtaining operation is requested.

16. The AF according to claim 13, wherein, the one or more first parameters are at least one of:

packet delay jitter measurement duration, packet delay jitter measurement frequency, and a quantity of packet delay jitter measurement times.

17. A method of monitoring packet delay jitter, the method being performed by Data Analytics Function DAF, the method comprising:

receiving packet delay data and one or more first parameters from Policy Control Function PCF, wherein the one or more first parameters are configured to represent one or more time-related parameters that need to be referred to for obtaining the delay jitter;

obtaining the packet delay jitter according to the packet delay data and the one or more first parameters;

sending the packet delay jitter to the PCF.

18. The method according to claim 17, wherein the one or more first parameters are at least one of:

packet delay jitter measurement duration, packet delay jitter measurement frequency, and a quantity of packet delay jitter measurement times.

19. Data Analytics Function DAF, comprising:

a processor, a memory and a program stored on the memory and executable on the processor, wherein when the program is executed by the processor, the processor implements steps of the method of monitoring packet delay jitter according to claim 17.

20. The DAF according to claim 19, wherein, the one or more first parameters are at least one of:

packet delay jitter measurement duration, packet delay jitter measurement frequency, and a quantity of packet delay jitter measurement times.

* * * * *